Figure 1:
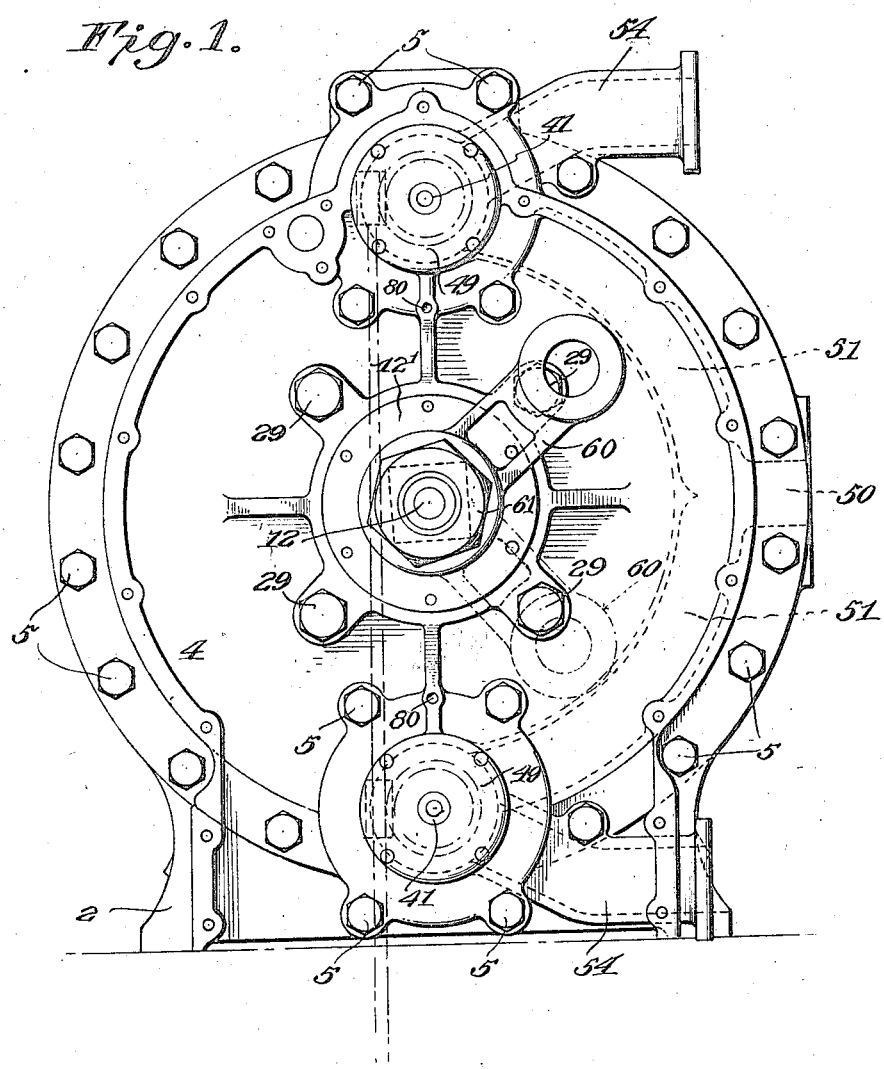

Nov. 6, 1923.

J. C. PERAZA 1,473,199

OSCILLATING INTERNAL COMBUSTION ENGINE

Filed March 25, 1921  8 Sheets-Sheet 1

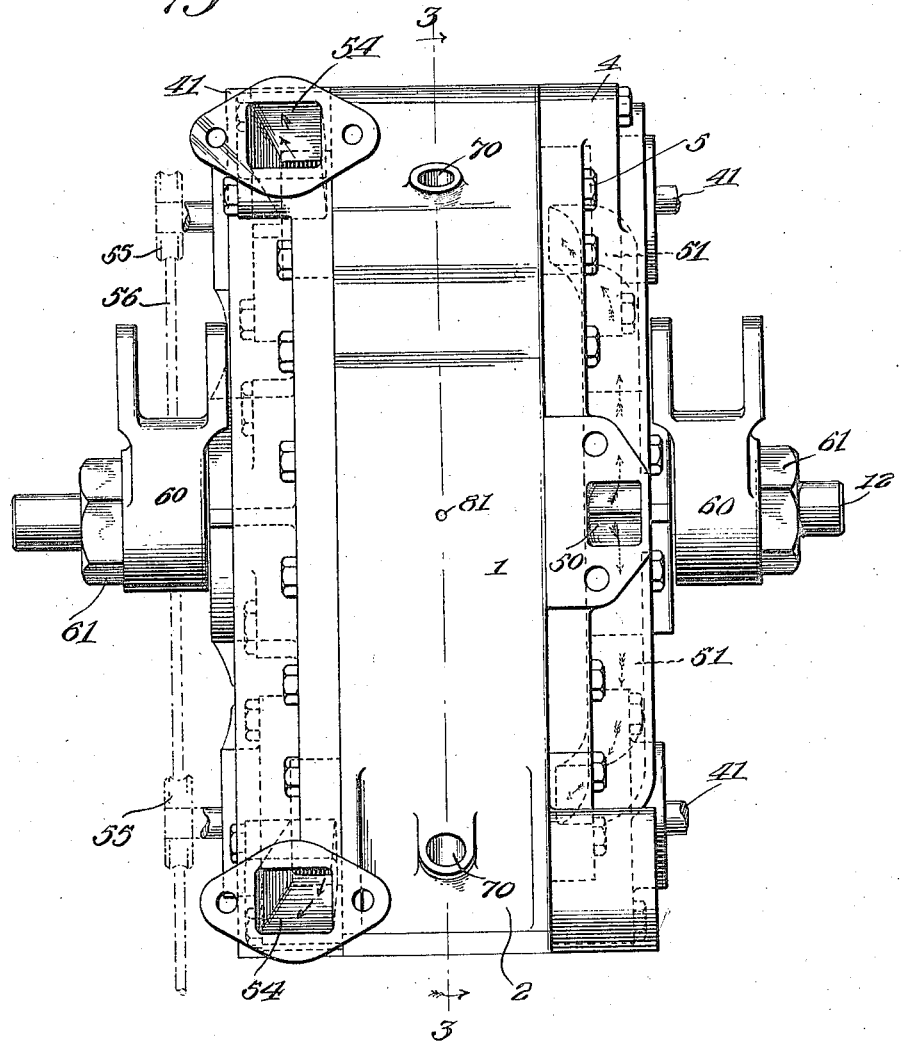

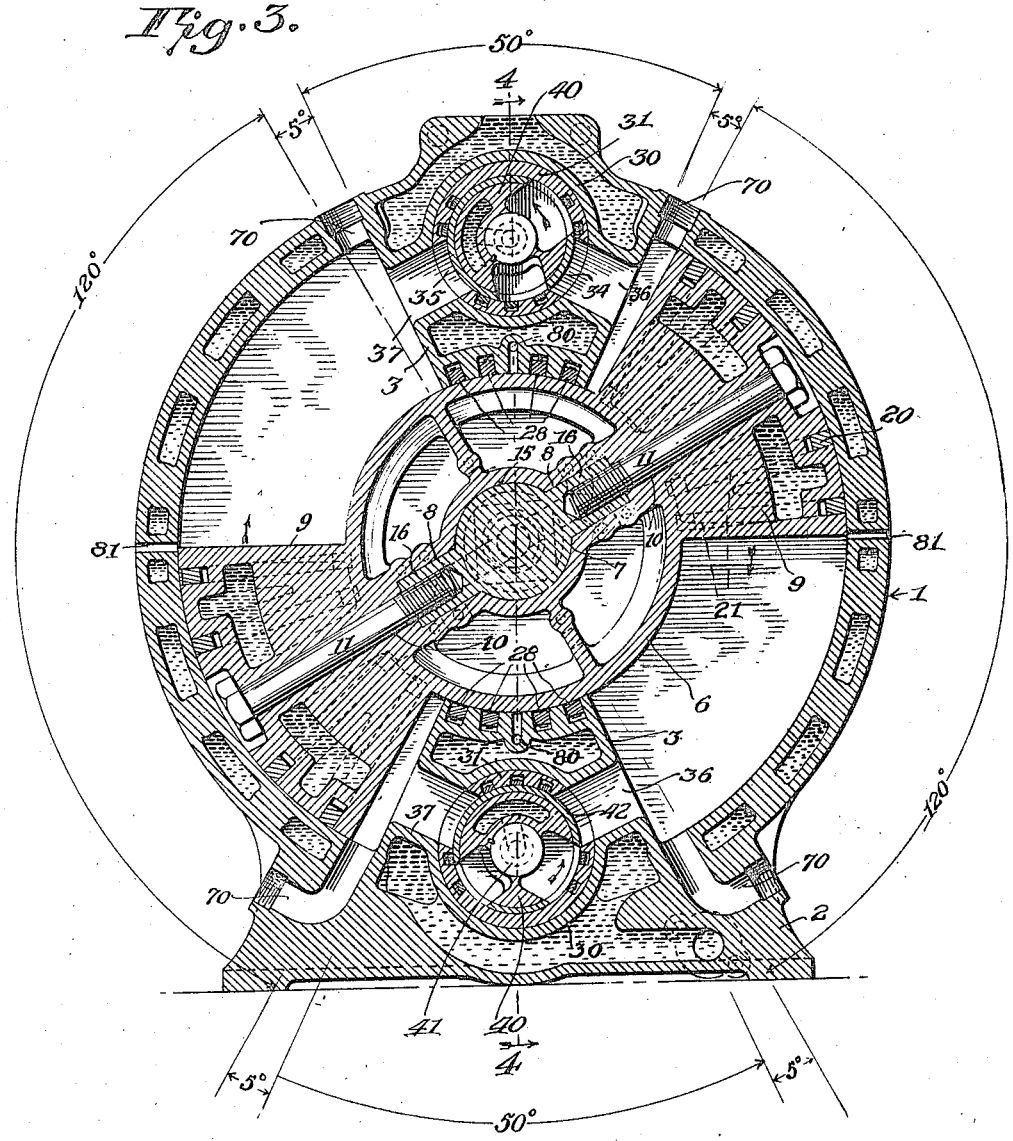

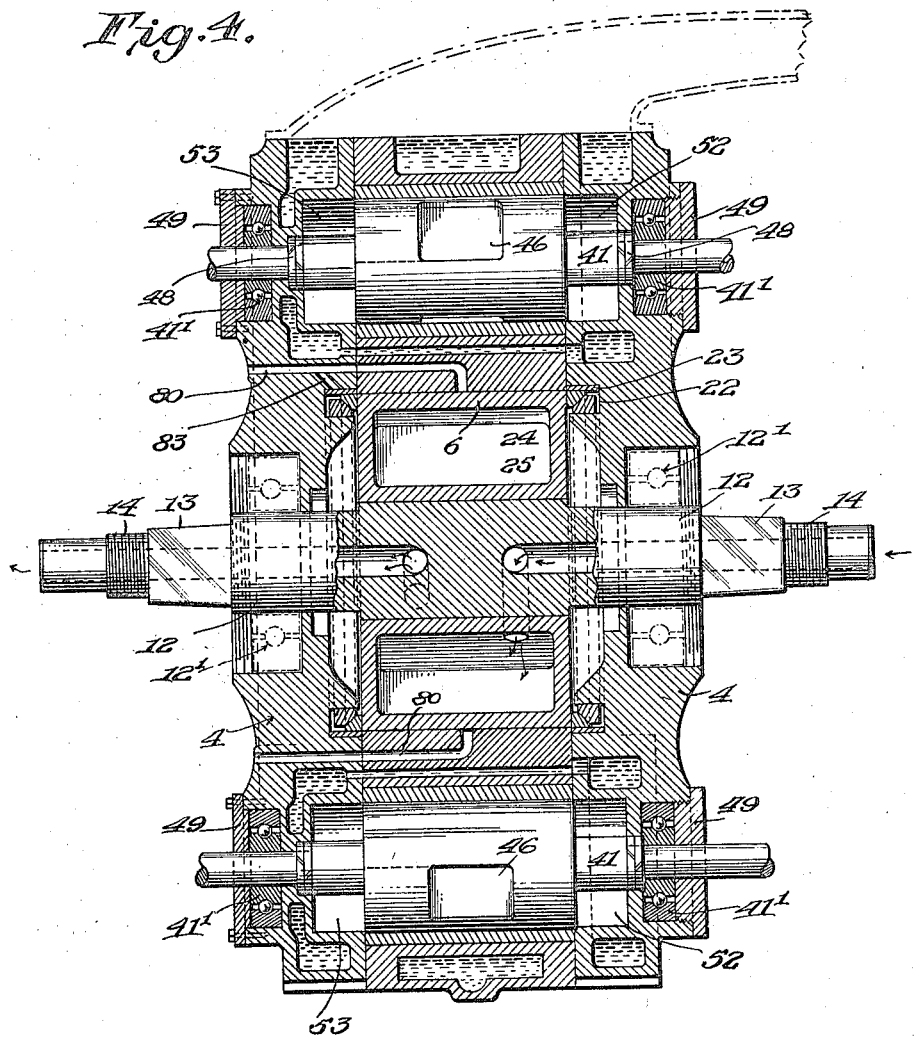

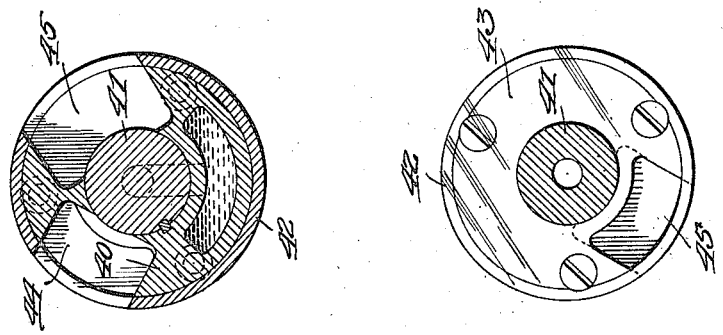
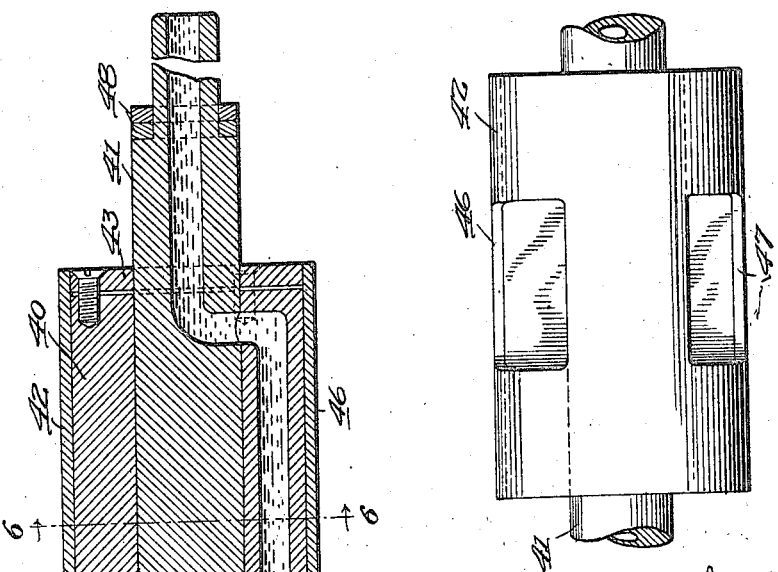
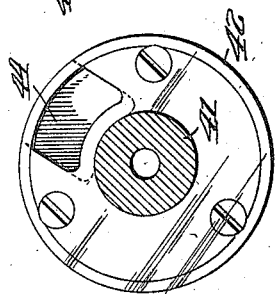

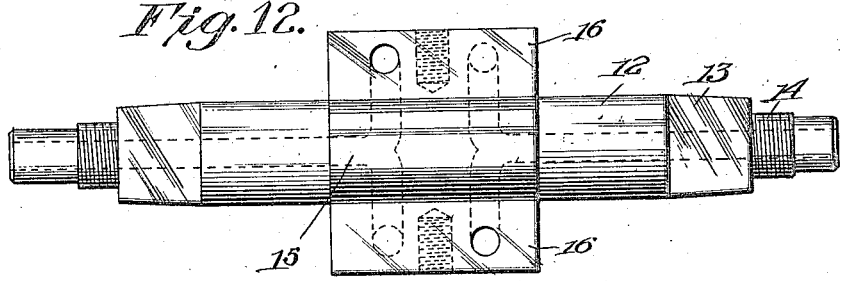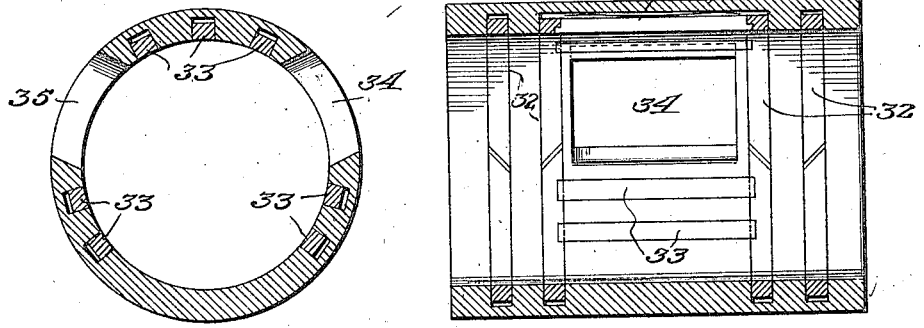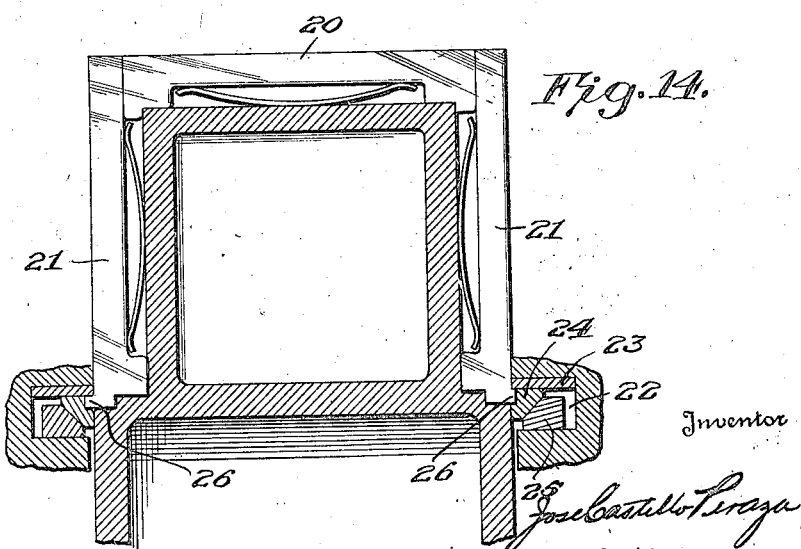

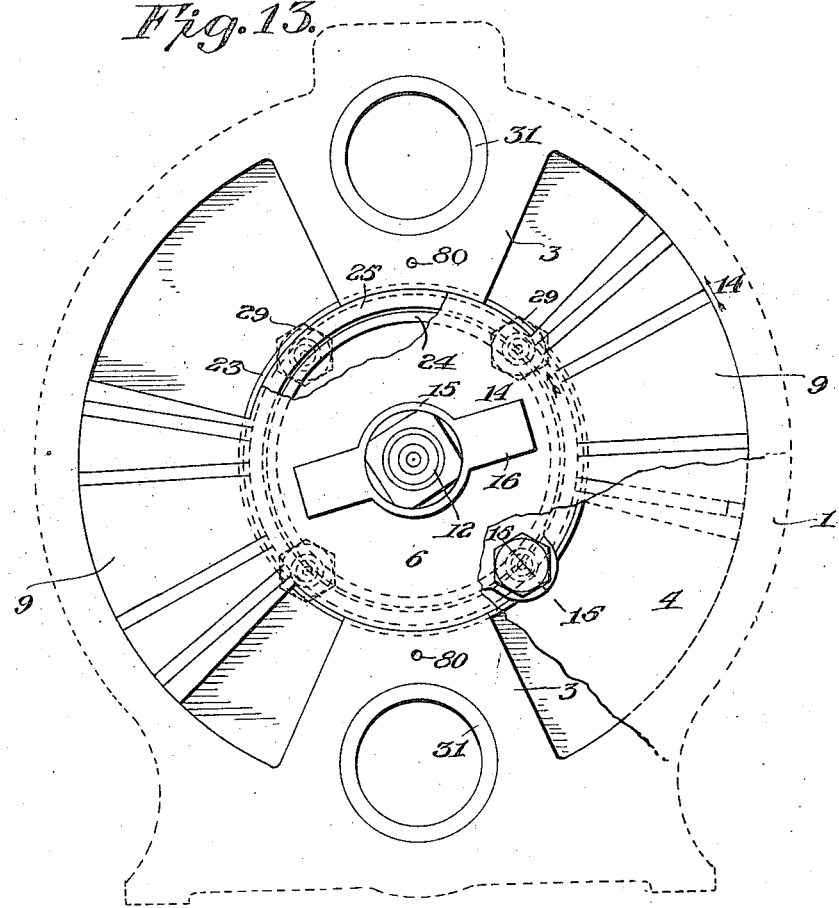

Nov. 6, 1923.
J. C. PERAZA
1,473,199
OSCILLATING INTERNAL COMBUSTION ENGINE
Filed March 25, 1921        8 Sheets-Sheet 8
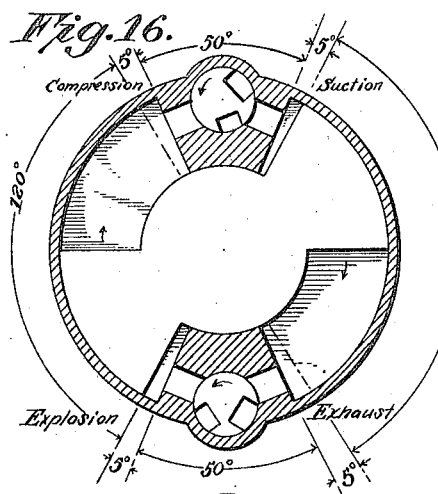
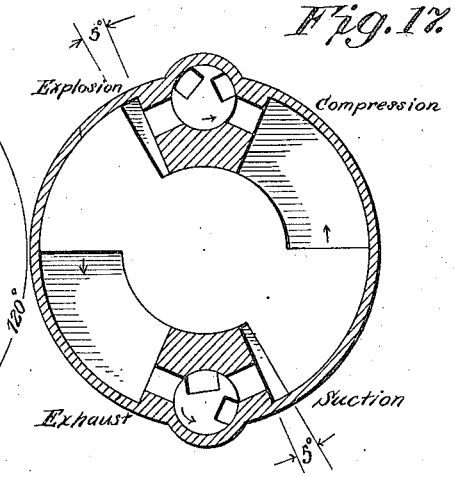
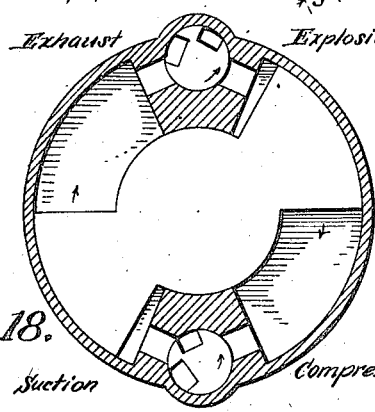
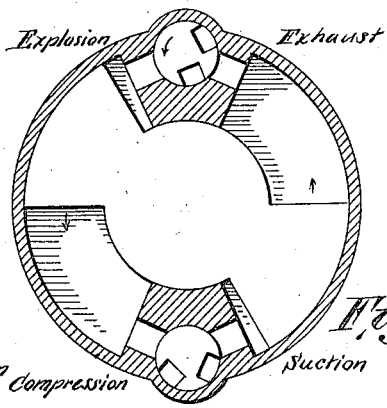
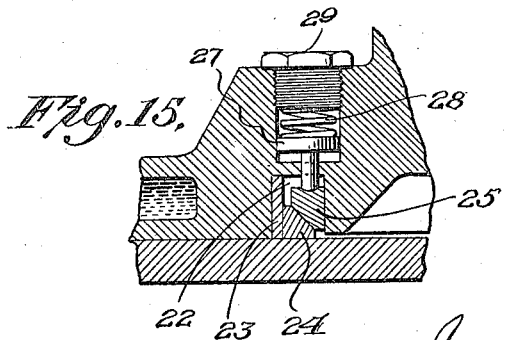
Inventor
Jose Castillo Peraza
By Chas. J. O'Neill
Attorney Patented Nov. 6, 1923.

1,473,199

UNITED STATES PATENT OFFICE.

JOSE CASTILLO PERAZA, OF NEW YORK, N. Y.

OSCILLATING INTERNAL-COMBUSTION ENGINE.

Application filed March 25, 1921. Serial No. 455,468.

*To all whom it may concern:*

Be it known that I, JOSE CASTILLO PERAZA, a citizen of the Republic of Mexico, residing at and whose post-office address is 285 St. Nicholas Avenue, in the city of New York, county and State of New York, have invented certain new and useful Improvements in Oscillating Internal-Combustion Engines; and I do hereby declare the following to be a full, clear, and exact description of the invention, such as will enable others skilled in the art to which it appertains to make and use the same.

The invention relates to certain improvements in oscillating internal combustion engines involving a generally cylindrical casing having two opposite abutments dividing the same into two working chambers and a swinging piston having an enlarged central hub cooperating with the inner faces of the abutments and oppositely disposed radial sections or arms, which operate in the chambers under the influence of the explosive charges, said charges being admitted to the four explosion chambers in proper sequence and subjected to the usual four cycles of suction, compression, explosion, and exhaust, under the control of two rotary valves, one in each of the abutments aforesaid, which valves are properly operated from a rotary shaft, which receives its motion from the oscillating shaft of the engine, upon which the piston aforesaid is mounted. The object of the invention is to generally increase the efficiency of engines of this type, render the same more durable and less liable to derangement under the ordinary conditions of use. The invention also contemplates material simplification of the several component parts of the engine and the construction of the apparatus as a whole, whereby not only the first cost of the apparatus will be materially reduced, but the cost of operation, maintenance and repair will also be materially lessened.

The invention is illustrated in the accompanying drawings, in which:—

Fig. 1 is an end elevation of the engine;
Fig. 2 is a side elevation thereof;
Fig. 3 is a vertical section on line 3—3 of Fig. 2;
Fig. 4 is a section on line 4—4 of Fig. 3;
Fig. 5 is a longitudinal section through one of the combined rotary supply and exhaust valves;
Fig. 6 is a sectional elevation on line 6—6 of Fig. 5;
Fig. 7 is an end elevation of the rotary valve;
Fig. 8 is a side elevation thereof;
Fig. 9 is a view similar to Fig. 7 of the opposite end of the valve;
Fig. 10 is a vertical longitudinal section through one of the valve bushings;
Fig. 11 is a vertical transverse section through said bushing;
Fig. 12 is a side elevation of the shaft upon which the oscillating piston is mounted;
Fig. 13 is a diagrammatic view of the engine, illustrating the mounting of the piston and the disposition of the packing means between the piston and the engine casing;
Fig. 14 is a fragmentary sectional elevation of one of the piston ends showing the packing means applied thereto;
Fig. 15 is a detail sectional view showing the means for adjusting the packing rings between the piston hub and the walls of the casing;
Figs. 16, 17, 18 and 19 are diagrams showing the relative positions of the piston and valves for a complete operation of the engine.

Referring to the drawings, numeral 1 represents the main body portion of the engine casing, which is in the form of a generally cylindrical hollow casting having an integral base 2 and two oppositely disposed abutments 3, 3, which serve to divide the casing into two chambers in which the operating wings of the piston operate. The casing is preferably cast with water passages in the periphery thereof and also in the abutments to admit of the circulation of water to cool the engine parts. The open ends of the casing are closed by cover plates 4, secured to the peripheral edges of the casing and also to the abutments 3 by bolts 5, as more particularly illustrated in Figs. 1 and 2. Mounted centrally within the casing 1 is an oscillating piston member comprising a hollow cylindrical hub section 6 and two radially disposed wing or vane sections 9, 9, oscillating between the arcuate ends of the inner abutments 3 and the vanes or wings 9 engaging the inner wall of the casing 1 at their peripheral edges and the inner faces of the cover plates 4 with their lateral faces, the end faces of the wings or vanes 9 being in planes radial to the axis of oscillation. It has been found that the following dimensions and relative proportions of the abutments, working chambers and piston wings or vanes have proven effective in producing an economical and highly efficient engine, which operates smoothly, without shocks or jars, and with comparatively little wear between the relatively moving parts, to-wit: The annular dimensions of each of the abutments is 50°; the total length of each of the chambers, in which the piston wings operate, is 130°, the terminal 5° at each end thereof being clearance space; and the angular dimension of each piston wing is 60°, so that the travel of a piston wing in each half oscillation is 60°, and the hub section 6 is of a diameter equal to one-half that of the interior of the cylindrical casing, as indicated in Fig. 3. The oscillating piston member is cast as an integral body provided with hollow cores in the hub and wing sections to provide circulation passages for cooling water, and the central portion of the hub is formed with a central circular recess 7 and two opposite rectangular recesses 8 opening therein to receive a specially constructed shaft to afford a simple but strong and rigid connection between the piston and the shaft devoid of ordinary gibs or keys, which have proved elements of weakness in structures of this general character heretofore. The shaft 12 aforesaid is provided at its mid-section with a central cylindrical boss 15 terminating in lateral wings 16, which parts accurately fit the hollow section within the hub, as illustrated in Figs. 3 and 12, the said central section of the shaft being securely locked to the piston member by radial bolts 11 passing through the wing sections of the piston and engaging screw threaded recesses in the lateral wing sections 16 of the shaft. Preferably the shaft 12 is formed with water circulating passages, which connect with the hollow hub section 6 of the piston and with the recesses in the wings, so that cooling water forced in through one end of the shaft traverses the several hollow members of the piston hub and wing sections and is discharged through the opposite open end of said shaft 12. The shaft 12 is journalled in opposite bearings 12' adjustably mounted in central recesses in cover plates 4, as indicated in Figs. 1 and 4, and each end of said shaft is provided with taper sections 13 adapted to receive crank arm 60, which is held in position by means of a suitable lock nut 61 engaging the corresponding screw threaded section 14 adjacent the taper section 13 of said shaft.

Special forms of packing devices are provided to insure substantially pressure-tight engagements between the relatively moving parts of the engine, as follows. Each of the vane or wing sections 9 of the piston is provided with a series of longitudinal slots in the peripheral portions thereof adapted to receive transverse packing bars 20, and the lateral faces are provided with radial slots to receive packing bars 21. Each of the end plates 4 is provided in its inner face with a circular slot 22 adapted to receive a hard metal bearing ring 23 and two concentric packing rings 24 and 25, having cooperating bevelled faces, said rings 24 and 25 being adapted to be held in engagement with each other and with the bearing ring 23 and the opposite wall of the recess 22, by means of follower pins 27 mounted in recesses in the end plates and acted upon by helical springs 28, the tension of which is adjusted by means of set screws 29. The pins 27 serve to force and hold the packing rings 23 and 24 together with yielding pressure and also to force the inner face of the ring 24 into accurate engagement with the side wall of the hub section 6 of the piston member near the peripheral edge of the latter and thereby prevent the gases under heavy pressure, due to the compression stroke of the piston on the one hand and the explosion stroke on the other, escaping between the piston hub and the end plates. The packing ring 24 is interlocked with the ends of the radial packing bars 21 by means of lugs 26 on the lower ends of said bars engaging notches in the ring 24, so that said ring partakes of the oscillatory movement of the piston and any wear which may take place will be imposed on the rings 23, 24 and 25 and may be readily compensated by setting up the screws 29. This particular form of packing is described and claimed in my companion application filed of even date herewith, Serial No. 455,309, filed March 24, 1921.

Tight joints are maintained between the inner cooperating faces of the abutments 3 and the outer surface of the hub 6 by providing the abutments with transverse slots, in which are mounted spring pressed packing bars 28.

Formed integrally in each of the abutments 3 is a generally cylindrical valve casing 30, in which is mounted, preferably with a driven fit, a cylindrical bushing 31, illustrated in detail in Figs. 3, 10 and 11, the inner face of said bushing being provided with circumferential recesses to receive packing rings 32, and with longitudinal recesses extending between the inner sets of packing rings 32 to receive spring pressed packing bars 33, the packing rings and bars being disposed about ports 34 and 35 in the bushing which serve as combined inlets and exhausts for the explosion chambers formed between the abutments 3 and the end walls of the piston wings or vanes 9. Each bushing 31 not only has a tight fit in its abutment, but it is also clamped in place between the side plates 4 bolted to the casing.

Mounted in each of the bushings 31 is a combined inlet and exhaust valve, illustrated in detail in Figs. 3 to 9 inclusive. Each of said valves includes a central generally cylindrical portion 40, preferably made of aluminum, or other relatively light metal, keyed to a shaft 41, which is journalled in bearings 41' in the end plates 4. The body of the valve is provided with two recesses 44 and 45, extending from the respective ends of the valve toward the middle section thereof and communicating with an inlet chamber 52 and an outlet chamber 53 respectively, which chambers are formed in the end plates 4. The central portion of the valve is incased in a shell 42, preferably of steel or other wear resisting material, and two annular end plates 43, the shell 42 accurately fitting the bore of the bushing 31 and being provided with ports 46 and 47 communicating with the valve passages 44 and 45 respectively and with the channels or ports 36 and 37 leading from the valve casing to the working chambers of the engine. Preferably the valve body is cast hollow to provide a chamber for cooling water, which is in communication with passages through both ends of the shaft 41, which permits the cooling water to circulate through each of the valves. Suitable ring packings 48 are interposed between the sections of the shaft 41 and the end walls of the inlet and exhaust chambers 52 and 53 adjacent the shaft bearings 41', 41'.

A common supply passage 50, formed in one of the cover plates 4, is adapted to be connected with the carburetor or other source of supply of explosive mixture, and said passage is provided with two branches 51, 51, which extend through the body of the end plate and communicate at their outer ends with the inlet chambers 52 of the upper and lower supply and exhaust valves respectively. Each of the exhaust chambers 53 of the upper and lower valves communicates with discharge passages 54 constituting extensions of the opposite cover plate and may, if desired, be connected with an ordinary exhaust manifold.

The rotary valves 40 are operated in properly timed relation by means of gears 55 on the outer ends of the shafts 41, 41, which are driven by worm sections carried by shaft 56, which latter is driven from the rotary shaft operated by the engine.

The engine casing 1 is provided at points adjacent the sides of the abutments 3 with tapped openings 70 adapted to receive spark plugs for igniting the charges in the combustion chambers.

In order to properly lubricate the relatively moving surfaces of the pistons and the engine casing, oil feed passages 80 are provided through one of the cover plates 4 and the abutments 3, 3, the passage being provided with an angular bend at its inner end to discharge the oil through the face of the abutment and on to the cylindrical surface of the hub of the piston. Oil supply openings 81 are also provided in the peripheral edge of the main casing 1 to deliver oil to the inner peripheral surfaces of the piston wings and the interior wall of the engine casing. The upper oil duct 80 is also provided with a branch 83 which communicates with the recess 22 in which the packing rings 24 and 25 operate, and as this recess fills with oil the surplus flows into the annular recess between the end plate and the piston hub and thence into the shaft bearing 12' to lubricate the latter.

As indicated, a crank 60 is attached to the shaft 12 on each side of the engine, and the two cranks, thus provided, are adapted to be connected with an ordinary crank shaft, to which either a continuous rotary or oscillating motion may be imparted, or, if desired, the cranks aforesaid may be attached to any other type of device to which the movement of the engine is to be imparted.

The sequence of operations is diagrammatically indicated in Figs. 16, 17, 18 and 19 and the legends thereon clearly indicate the condition maintained in each of the four chambers between the operating faces of the piston wings and the cooperating abutments for a complete oscillation of the piston element, the engine operating on the four cycle principle.

What I claim is:

1. An internal combustion engine comprising a cylindrical casing having oppositely disposed radial abutments therein dividing the casing into two chambers, end cover plates for the casing, an oscillating piston having a cylindrical hub engaging said abutments and radial arms operating in said chambers, said hub having a central circular opening and two oppositely disposed recesses extending therefrom, and a shaft journalled in said cover plates and having a middle section comprising a cylindrical portion and two radial wings fitting the opening in the hub.

2. An internal combustion engine comprising a cylindrical casing having oppositely disposed radial abutments therein dividing the casing into two chambers, end cover plates for the casing, an oscillating piston having a cylindrical hub engaging said abutments and radial arms operating in said chambers, said hub having a central circular opening and two oppositely disposed recesses extending therefrom, a shaft journalled in said cover plates and having a middle section comprising a cylindrical portion and two radial wings fitting the opening in the hub, and radial bolts passing through the piston arms and engaging the wing sections of the piston.

3. An internal combustion engine, comprising a cylindrical casing having oppositely disposed radial abutments dividing the casing into two chambers, an oscillating piston having a cylindrical hub engaging said abutments and radial arms operating in said chambers, said hub having a central circular opening and two oppositely disposed recesses extending therefrom, a shaft journalled in said cover plates and having a middle section comprising a cylindrical portion and two radial wings fitting the opening in the hub, rotary valves in said abutments connected with said chambers, end cover plates for the casing, and inlet and exhaust passages in said cover plates communicating with the casings of the rotary valves.

4. An internal combustion engine comprising a cylindrical casing having oppositely disposed radial abutments dividing the casing into two opposite piston chambers, an oscillating piston having a cylindrical hub journaled in the casing between said abutments and having radial arms operating in said chambers, each radial abutment having a transverse cylindrical valve chamber and passages leading therefrom to the opposite piston chambers, a rotary valve in each valve chamber having passages leading from its opposite ends to ports in its intermediate part to register with the passages in the abutment leading from the valve chamber to the opposite piston chambers, and cover plates secured to opposite sides of the casing and having cylindrical chambers positioned at the ends of the valve chambers and communicating with the passages leading through the ends of the adjacent valves, one of said cover plates having supply passages leading to the cylindrical chambers therein and the other cover plate having discharge passages leading from its cylindrical chambers.

5. An internal combustion engine comprising a cylindrical casing having oppositely disposed radial abutments dividing the casing into two opposite piston chambers, an oscillating piston having a cylindrical hub journaled in the casing between said abutments and having radial arms operating in said chambers, each radial abutment having a transverse cylindrical valve chamber and passages leading from ports at the intermediate part of the valve chamber to the opposite piston chambers, a bushing co-extensive with each valve chamber and having openings through its walls registering with the ports leading from said chamber, a valve rotatable in each bushing having passages leading from its opposite ends to ports positioned in its intermediate part to register with the ports in said bushing as the valve is rotated, and cover plates secured to opposite sides of the cylindrical casing and clamping the bushings in the valve chambers between them, said plates having cylindrical chambers positioned at the ends of the valve chambers and communicating with the passages leading through the ends of the adjacent valves, one of said cover plates having supply passages leading to the cylindrical chambers therein and the other cover plate having discharge passages leading from its cylindrical chambers.

In testimony whereof I affix my signature.

JOSE CASTILLO PERAZA.